United States Patent Office 3,323,980

Patented June 6, 1967

3,323,980

PROCESS OF SIZING PAPER WITH WATER-SOLUBLE VINYLIMIDAZOLINE POLYMERS

Franz Poschmann, Hans Wolf, Matthias Marx, and Hans Wilhelm, Ludwigshafen (Rhine), Germany, assignors to Badische Anilin- & Soda-Fabrik Aktiengesellschaft, Ludwigshafen (Rhine), Germany No Drawing. Filed Mar. 8, 1963, Ser. No. 263,752
Claims priority, application Germany, Mar. 14, 1962, B 66,341; Oct. 6, 1962, B 69,125
10 Claims. (Cl. 162—168)

This invention relates to the use of water-soluble polymers derived from compounds of the type of imidazole which have an ethylenically unsaturated polymerizable group on the nitrogen atom, and other ethylenically unsaturated compounds, for sizing paper.

It is known from Belgian patent specification No. 599,540 and U.S. patent application Ser. No. 71,902, filed Nov. 28, 1960, now U.S. Patent 3,174,874, by Hans Fikentscher, Karl Herrle, Gernot Winter, Heinz Voss, Johann Georg Reich and Alfred Mueller to use dispersions of copolymers derived from difficultly water-soluble ethylenically unsaturated compounds and C-vinyl or N-vinyl substituted heterocyclic aromatic compounds having at least one quaternary nitrogen atom in the nucleus or in the side chain, for sizing paper. Dispersions of water-insoluble copolymers however have certain disadvantages as sizing agents, for example because there is always the risk that the dispersions may coagulate during use.

It is an object of this invention to provide a sizing agent which is soluble in water, which is suitable for stock sizing and also for surface sizing of paper, which is moreover suitable for sizing all kinds of paper and which may be used in a simple and convenient manner.

We have found that these and other objects are achieved in accordance with this invention by using as the sizing agent a water-soluble polymer derived from:

(a) at least 5% and preferably at least 20% by weight of a compound of the type of imidazole and having an ethylenically unsaturated polymerizable group on the secondary ring nitrogen atom, (b) from 0 to 95% and preferably from 0 to 80% by weight of one or more polymerizable ethylenically unsaturated compounds containing in the molecule a carbonamido group monosubstituted or disubstituted on the nitrogen atom, (c) from 0 to 50% by weight of one or more other water-soluble monomers, and (d) from 0 to 30% by weight of one or more other water-soluble monomers, all the percentages relating to the total amount of all the monomers.

Hereinafter in this specification, the polymers to be used according to this invention will be referred to briefly as polymers, the monomers of the type of imidazole (i.e. component (a)) will be referred to as monomer I, the monomers having the carbonamide grouping (i.e. component (b)) will be referred to as monomer II, the further monomers, if they are water-soluble (i.e. components (c)) will be referred to as monomer III and if they are water-insoluble (i.e. component (d)) will be referred to as monomer IV.

Monomers I are characterized by the fact that the molecule has the structure of imidazole or imidazoline and that the polymerizable group it attached to the secondary ring nitrogen atom. Compounds of this type can be characterized by the general formula

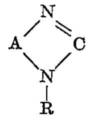

where A is a bivalent radical completing a ring containing five ring atoms and R is an ethylenically unsaturated polymerizable group. Examples of such compounds are: N-vinylimidazoline, N-vinylmethylimidazoline, N-acryloylimidazoline, 4 - methyl - N - vinyl-imidazole, N-vinylbenzimidazole, N-acryloylimidazole and their salts and quaternisation products, for example N-vinyl-N'-methylimidazolium methyl sulfate or N-vinyl-2-methylimidazolinium hydrochloride, sulfate or nitrate. Particular importance attaches to N-vinylimidazole and its salts and quaternisation products.

A common feature of monomers II (which are preferably used in addition to monomers I) is a monosubstituted or disubstituted carbonamido group. The most important examples of this class are N-vinyl lactams, such as N-vinylpyrrolidone, N-vinylpiperidone and N-vinylcaprolactam. Other suitable monomers II are monosubstituted amides of acrylic acid or methacrylic acid, such as methyl acrylic amide, methyl methacrylic amide, ethyl acrylimide, ethyl methacrylamide, isopropyl acrylamide, isopropyl methacrylamide, tertiary butyl acrylic amide, tertiary butyl methacrylamide, cyclohexyl acrylamide, cyclohexyl methacrylamide, dimethylacrylamide, dimethyl methacrylamide, diethyl acrylamide, diethyl methacrylamide, and the pyrrolidide, piperidide, and morpholidide of acrylic acid and methacrylic acid; the said radicals may also be substituted, for example by chlorine, hydroxyl groups, amino groups or quaternary ammonium groups; examples of compounds of this type are N,N'-diethylaminomethylene methacrylamide and its quaternization product.

Examples of monomers II are particularly water-soluble monomers containing a nitrogen atom in the molecule, preferably acrylonitrile and also methacrylonitrile, acrylamide, methacrylamide and maleic imide; the following are however also suitable: $\alpha,\beta$-unsaturated carboxylic acids, such as acrylic acid, methacrylic acid, maleic acid, fumaric acid, itaconic acid and vinylsulfonic acid and the salts of these acids. The proportion of monomers III should however not exceed 50% by weight with reference to the total amount of monomers.

Finally up to a maximum of 30% by weight of the total amount of monomers of water-insoluble monomers IV is used to modify the properties of the polymers; examples of monomers IV are styrene, vinyl chloride, vinylidene chloride, vinyl esters, acrylic esters and vinyl ethers.

In most cases it is advantageous for the total amount of monomers III and IV not to exceed 50% by weight, preferably not to exceed 30% by weight.

It is also possible to incorporate two or more of one and the same monomer type (I to IV) in a single polymer. The sizing effect of the polymers does not appear to be dependent on the molecular weight thereof and consequently on their K-value, if the latter is more than 20. A definition of K-value is given for example by H. Fikentscher in Cellulosechemie, volume 13 (1932), p. 58.

The ratio of the monomers in the polymers is chosen so that the polymers form with water at room temperature, solutions which are clear or only slightly cloudy.

The composition of the most effective polymers for specific types of paper and for the desired purpose within the art may be ascertained by simple preliminary experiment.

The polymers may be used like conventional sizing agents in paper manufacture, either alone or together with other sizing agents, particularly rosin size and chemically modified rosin size. Examples of other sizing agents are paraffin dispersions, condensation products of polyalkylene polyamines and higher fatty acids and dispersions of cationic polymers.

In stock sizing, the polymers are preferably added in the form of dilute aqueous solutions in such amounts that the concentration of the polymers in the fibrous stock is about 0.1 to 2% by weight with reference to the fiber content of the stock.

The polymers are suitable both for stock sizing and for surface sizing of paper; in the latter case, paper which is unsized or requires improvement is treated with an aqueous solution of the polymer, preferably of 0.1 to 1% strength.

All types of paper, but particularly unbleached fiber stock containing lignin, may be sized with the polymers.

Surprisingly it has been found in many cases that the polymers are not only outstanding sizing agents but that the properties of the paper are improved by treatment with the polymers in other respects. Thus for example dry strength and wet strength of the paper is increased, resistance to picking is increased and filler retention is improved. Moreover papers which have been prepared using the polymers as sizing agents have less tendency to dust and may be colored better, particularly with pigments. In the manufacture of the paper, the freeness is reduced by adding the polymers and a further advantage is that the waste water from the paper machine may be clarified more easily from paper fibers owing to the presence of the polymers.

Although papers treated with the polymers exhibit very good sizing, they still have good wettability so that for example they may be dyed, printed or written on and may also be aftertreated with aqueous solutions and dispersions.

The polymers are characterized by a number of outstanding features in their efficiency which have not been combined in any of the conventional sizing agents.

For example the following disadvantages in rosin sizing, namely intermittent operation necessitated by the two-component system, difficulties in metering, sensitivity to temperature, acid reaction of the paper machine water and the finished paper, which is consequently less strong, less resistant to aging and less resistant to alkalies, are all obviated by the use of the polymers. The polymers offer considerable advantages over conventional water-insoluble sizing agents.

Apart from the fact that the polymers can be distributed well in the fibrous stock without trouble and that therefore very uniform sizing is achieved, the coemployment of dispersing agents and similar substances which is necessary in the case of water-insoluble sizing agents can be dispensed with when using the copolymers because they are water-soluble. In some cases the polymers exert an excellent dispersing action on the customary paper fillers.

Water-soluble sizing agents which have hitherto been proposed have not proved to be suitable. For example condensation products of polyalkylene polyamines and higher fatty acids have been proposed (inter alia in British patent specification No. 711,404, published on June 30, 1954), but such solutions have a strong tendency to froth, the paper must be heated for a longer period and at higher temperatures than otherwise usual for development of the sizing, and often the strength of papers thus sized leaves much to be desired.

The polymers may be readily metered so that continuous operation with a constant concentration of sizing agent is possible. The sizing effect is not affected by the pH values which occur in paper manufacture; this is extremely important for the production of high-grade papers having a neutral reaction. Furthermore the sizing is not limited to a specific temperature treatment and is not impaired by the presence of other paper auxiliaries, fillers, pigments and the like.

It is surprising that the polymers, although they are soluble in water, are fixed on an average to an extent of more than 80% on the paper fibers.

The polymers do not cause any frothing in the water used in the paper machine, and the final paper is odorless.

As already stated, the polymers may be used with other sizing agents. It has been found that particularly good results as regards resistance of the paper to water are achieved by combining sizing according to this invention with rosin sizing.

The invention is further illustrated by the following examples in which percentages are by weight.

*Example 1*

(a) 135 ml. of a 0.1% solution of poly-N-vinylimidazole of K-value=42 (=135 mg.=0.8% with reference to the content of fibrous material);

(b) 168 ml. of a 0.1% solution of rosin size (=168 mg.=1% with reference to the content of fibrous material) and sufficient 1% alum solution to give the suspension of fibrous material the pH value 5; and (c) both the poly-N-vinylimidazole solution (a) and the rosin size components (b), are added to three identical batches of fibrous stock each of 4.2 liters of water and 16.8 g. of bleached sulfite pulp (degree of fineness 35° SR), and each processed in the usual way into paper having a weight of 75 g./sq. m.

The water resistance of this paper is determined by means of the flotation test in which the time taken for water to penetrate through half of a floating piece of paper is measured. These times are (a) 360 seconds, (b) 420 seconds and (c) about 2 hours.

The poly-N-vinylimidazole in sizing (a) is adsorbed on the fibers to the extent of 83%.

*Example 2*

Fibrous stock of 12 g. of soda pulp and 3 liters of water has 120 mg. of poly-N-vinylimidazole (K-value=42) added thereto in the form of a 0.1% aqueous solution and the whole is then processed at pH 7 in the usual way to a paper having a weight of 75 g./sq. m. In the flotation test, no penetration of water can be detected after two weeks; it is only after four weeks that water begins to penetrate in places.

*Example 3*

A sulfite pulp (degree of fineness 30° SR) is divided into two equal batches and (a) polyvinylimidazole is added to one and (b) rosin size and alum to the other as in Example 1, and then processed to papers having the weight 80 g./sq. m. The breaking length (i.e. the length at which a freely suspended paper strip tears through its own weight) is 5240 meters in the case of (a) and 4230 meters in the case of (b). The ink flotation period (analogous to the water flotation test) is 111 seconds in the case of (a) and 172 seconds in the case of (b).

*Example 4*

A fibrous stock of 60% of groundwood and 40% of unbleached sulfite pulp is sized with 1.3% of poly-N-vinylimidazole (K-value=28), with reference to the fibrous material, at pH 7 and processed into paper in the usual way. This paper has flotation times up to 50% penetration of 300 seconds on ink and more than 150 minutes on water.

*Example 5*

A paper of unbleached sulfite pulp (freeness 20° SR) which has been sized at pH 7 with 0.8% of poly-N-vinylimidazole (K-value=28) with reference to the amount of fibrous material, has a flotation time on ink of 240 seconds and on water of more than 90 mniutes before 50% penetration occurs.

*Example 6*

An absorbent paper having the weight 75 g./sq. m. and made from unbleached soda pulp is impregnated with a 0.1% solution of poly-N-vinylimidazole (K-value=28), pressed between filter paper and dried in the air. The flotation period of the paper on water, determined in the usual way, is more than two hours.

*Example 7*

Unbleached soda pulp is beaten to 30° SR in a hollander, divided into three equal batches and processed into papers having the weight 75 g./sq. m. in the usual way:

(a) at pH 7 without the addition of a sizing agent, (b) with 0.5% of rosin size (with reference to the amount of fibrous material) and alum at pH 5, and (c) with 1% of poly-N-vinylimidazole at pH 7 (K-value=32).

The duration of flotation on water of these papers determined as in Example 1 are (a) less than one second, (b) and (c) more than two hours. Flotation durations on ink measured analogously are (a) also less than one second, (b) 32 minutes and (c) 36 minutes. The values for the breaking length (dry) are (a) 6760 meters, (b) 5650 meters and (c) 10,460 meters. The breaking length (wet) measured at 20° after immersion for two hours, are (a) 91 meters, (b) 340 meters and (c) 1180 meters.

*Example 8*

In the case of a paper having the weight 75 g./sq. m. prepared from unbleached soda pulp, degree of fineness 30° SR, 0.4% of poly-N-vinylimidazole (K-value=32) and 0.4% of the solids of a dispersion of a copolymer from 54% of butyl acrylate, 23% of acrylonitrile and 23% of vinylimidazole quaternized with dimethyl sulfate, the flotation duration on water is longer than 2½ hours and the flotation duration on ink is longer than 2¼ hours.

*Example 9*

A fiber suspension of 48% of groundwood, 32% of unbleached sulfite pulp and 20% of china clay is divided into four batches of equal size and processed into papers having the weight 75 g./sq. m. according to the general directions of Zellcheming-Merkblatt 107, (a) without further additions at pH 7, (b) with 1% of rosin size with addition of alum at pH 5.5, (c) with 1% of poly-N-vinylimidazole (K-value=50) at pH 7 and (d) with 1% of poly-N-vinylimidazole and 1% of rosin size with addition of alum at pH 5.5, the dehydration rates being measured. These are (a) 50, (b) 48, (c) 40 and (d) 37 seconds.

When burnt, the papers leave behind (a) 7.5%, (b) 15.6%, (c) 12.5% and (d) 19.0% of ash with reference to their original dry weight; from this it will be seen that poly-N-vinylimidazole, particularly in combination with rosin size, is a good filler retention agent.

The values for the water flotation test are (b) about six minutes and (c) and (d) more than two hours; for the ink flotation test, the following values are measured: (b) 7.5, (c) 8.5 and (d) 63 minutes.

The stock suspension exhibits marked flocculation of the finest fiber constituents in tests (c) and (d). After the agitator is stopped, the fibrous stock tends to sediment in test (c) whereas flotation can be detected in test (d). Cloudiness of the effluent white water is strongest in test (a), about the same in tests (b) and (c) and least in test (d).

*Example 10*

A paper pulp of 1% of unbleached soda pulp and 99% of water is beaten to 35° SR and processed at pH 7 into papers having a weight of 80 g./sq. m.

(a) with 0.4% of poly-N-vinylimidazole (K-value=50) and (b) with 0.4% of solids of the dispersion specified in Example 8.

These papers are investigated according to TAPPI-method T441 M–58 for examination of their water absorbency according to Cobb. The values are (a) 53 and (b) 30 Cobb.

In both tests (a) and (b), the freeness is moreover reduced to 25° SR.

*Example 11*

A fibrous stock of 4.2 liters of water and 16.8 g. of bleached sulfite pulp (freeness 35° SR) has added to equal batches thereof 84 ml. of a 0.1% solution (=84 mg.=0.5% with reference to the content of fibrous material) of (a) a solution polymer of 75% of N-vinylimidazole, 20% of N-vinylpyrrolidone and 5% of acrylonitrile (K-value=66.5), (b) a solution polymer of 70% of N-vinylcaprolactam and 30% of N-vinylimidazole (K-value=41.0), (c) a solution polymer of 50% of N-vinylimidazole and 50% of N-vinylcaprolactam (K-value=42) and (d) rosin size with added alum (for comparison) and the batches are then worked up to papers having the weight 80 g./sq. m.

The ink resistance of these papers is determined by means of the ink flotation test in which the time which the ink takes to penetrate through half of the surface of a floating piece of paper is measured. These times are (a) about six minutes, (b) about twenty-three minutes, (c) thirty-six minutes and (d) half a minute.

*Example 12*

60 ml. of a 0.1% solution (=60 mg.=0.5% with reference to the content of fibrous material) of (a) a solution polymer of 70% of N-vinylimidazole and 30% of N-vinylcaprolactam (K-value=41.0), (b) a solution polymer of 30% of N-vinylimidazole and 70% of N-vinylcaprolactam (K-value=39.6), (c) for comparison therewith, 120 ml. of a 0.1% solution (=120 mg.=1% with reference to the content of fibrous material) of rosin size with added alum, are added to a fibrous stock of 3 liters of water and 12 g. of an unbleached soda pulp (freeness 34° SR) and processed at pH 7 in the usual way into papers having the weight 75 g./sq. m.

The ink flotation period of these papers is (a) 85 minutes, (b) more than 120 minutes and (c) in spite of twice the concentration of size, only 32 minutes.

*Example 13*

120 ml. of a solution (=120 mg.=1% with reference to the content of fibrous material) of:

(a) a solution polymer of 70% of N-vinylimidazole and 30% of acrylonitrile (K-value=29.7), (b) a solution polymer of 57% of N-vinylimidazole and 43% of acrylic acid (K-value=78.2), (c) a solution polymer of 80% of N-vinylimidazole and 20% of acrylonitrile, (d) 60 ml. (=60 mg.=0.5% with reference to the content of fibrous material) of a 0.1% solution of a solution polymer of 60% N-vinylimidazole, 35% of N-vinylpyrrolidone and 5% of acrylonitrile (K-value=94.5), (e) 30 ml. of a 0.1% solution (=30 mg.=0.25% with reference to the content of fibrous material) of a solution polymer of 30% of N-vinylimidazole and 70% of N-vinylpyrrolidone (K-value=96), and (f) (for comparison) 120 ml. of a 0.1% solution (=120 mg.=1% with reference to the content of fibrous material) of rosin size with added alum are added to a fibrous stock of 3 liters of water and 12 g. of an unbleached soda pulp (freeness 35° SR) and processed in the usual way at pH 7 into papers having the weight 75 g./sq. m.

The breaking length (dry) of the papers (i.e. the length at which a freely suspended strip of the paper will tear through its own weight) is (a) 8050 meters, (b) 8310 meters, (c) 10,400 meters, (d) 9610 meters, (e) 8920 meters and (f) only 5650 meters.

*Example 14*

60 ml. of a 0.1% solution (=60 mg.=0.5% with reference to the content of fibrous material) of:

(a) a solution polymer of 20% of N-vinylimidazole, 40% of N-vinylcaprolactam and 40% of N-vinylpyrrolidone (K-value=74.3), (b) a solution polymer of 30% of N-vinylimidazole and 70% of N-vinylcaprolactam (K-value=66.5), and (c) (for comparison) rosin size with added alum are added to a fibrous stock of 3 liters of water and 12 g. of an unbleached soda pulp (freeness 34° SR) and processed in the usual way at pH 7 into papers having a weight of 75 g./sq. m.

The duration of flotation in water (analogous to the ink flotation test) of these papers is more than 120 minutes in all cases.

*Example 15*

Paper having the weight of 75 g./sq. m. is prepared from a fibrous stock as described in Example 14 with an addition of 0.5% with reference to the content of fibrous material of a solution polymer of 67% of N-vinyl-imidazole, 20% of acrylonitrile and 13% of dimethylacrylamide (K-value=56.1).

After the paper has been immersed for two hours in distilled water, the breaking length (wet) is 1050 meters. The wet breaking length of paper made from the same fibrous stock but without adding a sizing agent is 160 meters.

We claim:

1. In a process for the stock sizing of paper the improvement which comprises: adding to the paper stock an aqueous solution containing from 0.1 to 2% by weight based on the weight of the fiber content of the stock of a water-soluble polymer having a K value of at least 20, at least 5% by weight of said polymer being derived from a compound selected from the group consisting of N-vinylimidazoline, N-vinylmethylimidazoline, N-acryloylimidazoline, N-vinylimidazole, 4-methyl-N-vinylimidazole, N-vinylbenzimidazole, N-acryloylimidazole, and the salts and quaternization products thereof.

2. A process for the sizing of paper as claimed in claim 1 wherein at least 20% by weight of said polymer is derived from a compound selected from the group consisting of N-vinylimidazoline, N-vinylmethylimidazoline, N-acryloylimidazoline, N-vinylimidazole, 4-methyl-N-vinylimidazole, N-vinylbenzimidazole, N-acryloylimidazole, and the salts and quaternization products thereof.

3. A process for the sizing of paper as claimed in claim 1 employing as a sizing agent poly-N-vinylimidazole.

4. A process for the sizing of paper as claimed in claim 1 which comprises employing as sizing agents a water-soluble polymer derived from (a) 20 to 40% by weight of N-vinylimidazole and (b) 80 to 60% by weight of N-vinylpyrrolidone.

5. A process for the sizing of paper as claimed in claim 1 which comprises employing as sizing agents water-soluble polymers derived from (a) 20 to 40% by weight of N-vinylimidazole and (b) 80 to 60% by weight of N-vinylcaprolactam.

6. A process for the sizing of paper as claimed in claim 1 which comprises performing the said process in conjunction with the rosin sizing of paper.

7. In a process for the surface sizing of paper the improvement which comprises: impregnating a paper sheet with a homogeneous aqueous solution of 0.1 to 1% by weight strength of a water-soluble polymer having a K value of at least 20 as the sizing agent, at least 5% by weight of said polymer being derived from a compound selected from the group consisting of N-vinylimidazoline, N-vinylmethylimidazoline, N-acryloylimidazoline, N-vinylimidazole, 4-methyl-N-vinylimidazole, N-vinylbenzimidazole, N-acryloylimidazole, and the salts and quaternization products thereof.

8. A process for the sizing of paper as claimed in claim 7 wherein at least 20% by weight of said polymer is derived from a compound selected from the group consisting of N-vinylimidazoline, N-vinylmethylimidazoline, N-acryloylimidazoline, N-vinylimidazole, 4-methyl-N-vinylimidazole, N-vinylbenzimidazole, N-acryloylimidazole, and the salts and quaternization products thereof.

9. A process for the sizing of papers as claimed in claim 7 employing as a sizing agent poly-N-vinylimidazole.

10. A process for the sizing of paper as claimed in claim 7 which comprises employing as sizing agents a water-soluble polymer derived from (a) 20 to 40% by weight of N-vinylimidazole, and (b) 80 to 60% by weight of N-vinylpyrrolidone.

References Cited

UNITED STATES PATENTS

| | | | |
|---|---|---|---|
| 2,891,025 | 6/1959 | Price | 260—29.6 |
| 2,949,444 | 8/1960 | Lawson | 260—80.5 |
| 2,953,498 | 9/1960 | Werner | 260—88.3 |
| 3,166,525 | 1/1965 | Perry | 260—29.6 |
| 3,174,874 | 3/1965 | Fikentscher et al. | 117—155 |

FOREIGN PATENTS

| | | |
|---|---|---|
| 1,108,436 | 6/1961 | Germany. |

DONALL H. SYLVESTER, *Primary Examiner.*

S. L. BASHORE, *Assistant Examiner.*

UNITED STATES PATENT OFFICE

CERTIFICATE OF CORRECTION

Patent No. 3,323,980 June 6, 1967

Franz Poschmann et al.

It is hereby certified that error appears in the above numbered patent requiring correction and that the said Letters Patent should read as corrected below.

Column 2, line 42, for "monomers II" read -- monomers III --.

Signed and sealed this 22nd day of October 1968.

(SEAL)
Attest:

Edward M. Fletcher, Jr.
Attesting Officer

EDWARD J. BRENNER
Commissioner of Patents